United States Patent
Sofer et al.

(10) Patent No.: US 7,598,976 B2
(45) Date of Patent: Oct. 6, 2009

(54) METHOD AND APPARATUS FOR A MULTISENSOR IMAGING AND SCENE INTERPRETATION SYSTEM TO AID THE VISUALLY IMPAIRED

(75) Inventors: Eli Sofer, Hertzliya (IL); Amnon Tidhar, Yahud (IL)

(73) Assignee: I See Tech Ltd., Hertzliya (IL)

( * ) Notice: Subject to any disclaimer, the term of this patent is extended or adjusted under 35 U.S.C. 154(b) by 279 days.

(21) Appl. No.: 10/519,483

(22) PCT Filed: Jun. 12, 2003

(86) PCT No.: PCT/IL03/00496

§ 371 (c)(1),
(2), (4) Date: Sep. 15, 2005

(87) PCT Pub. No.: WO03/107039

PCT Pub. Date: Dec. 24, 2003

(65) Prior Publication Data

US 2006/0098089 A1    May 11, 2006

(51) Int. Cl.
*H04N 7/18* (2006.01)
*H04N 9/47* (2006.01)
*G09B 21/00* (2006.01)
*G08B 23/00* (2006.01)

(52) U.S. Cl. ..................................... 348/62

(58) Field of Classification Search ............... 348/62, 348/63; 340/407.1, 825.1, 573.1, 539.1, 340/825.19; 356/601; 382/293; 709/229; 434/112; *H04N 7/12, 9/47; G09B 21/00; G08B 23/00*
See application file for complete search history.

(56) References Cited

U.S. PATENT DOCUMENTS

| | | |
|---|---|---|
| 2,582,728 A | 1/1952 | Walker |
| 5,306,152 A | 4/1994 | Shimoda |
| 5,687,136 A | 11/1997 | Borenstein |
| 5,878,154 A | 3/1999 | Schimmelpfennig |
| 5,936,528 A | 8/1999 | Kubayashi |
| 5,973,618 A * | 10/1999 | Ellis ........................... 340/990 |
| 6,198,395 B1 * | 3/2001 | Sussman ................... 340/573.1 |
| 6,301,050 B1 * | 10/2001 | DeLeon ...................... 359/618 |
| 6,469,956 B1 * | 10/2002 | Zeng ........................... 367/116 |

(Continued)

OTHER PUBLICATIONS

Ifukube et al, "A Blind Mobility Aid Modeled After Echolocation of Bats", IEEE Transactions on Biomedical Engineering May 1991.
Capelle et al, "A Real-Time Experimental Prototype . . . of Vision Rehabiilitation Using Auditory Substitution", IEEE Transactions on Biomedical Engineering Oct. 1998.
Nye et al, "Sensory Aids for the Blind: A Challenging Problem With Lessons for the Future", Proceedings of the IEEE, Dec. 1970.

*Primary Examiner*—Tung Vo
(74) *Attorney, Agent, or Firm*—Edward Langer

(57) ABSTRACT

An apparatus and method for aiding a visually impaired or blind person to detect, identify and avoid objects in the field of vision of the surroundings. The apparatus includes electro-optical devices to detect and identify objects, a control unit, which receives and processes information from the devices and a vocal representation unit to receive instructions from the control unit for purpose of audibly describing the objects to the person in the field of vision, thereby enabling the person to cope and proceed safely in the surroundings. The method for aiding a visually impaired person to detect, identify and objects in the field of vision surroundings includes the steps of receiving visual images of the objects, receiving range information concerning the objects, processing the image information, and audibly describing to the person the objects in the field of vision, thereby enabling the person to cope with, and proceed in his surroundings.

20 Claims, 6 Drawing Sheets

U.S. PATENT DOCUMENTS

| | | | |
|---|---|---|---|
| 6,523,066 B1 * | 2/2003 | Montroy et al. | 709/229 |
| 6,549,122 B2 * | 4/2003 | Depta | 340/407.1 |
| 6,763,148 B1 * | 7/2004 | Sternberg et al. | 382/293 |
| 6,774,788 B1 * | 8/2004 | Balfe | 340/539.13 |
| 6,975,991 B2 * | 12/2005 | Basson et al. | 704/271 |
| 2002/0057438 A1 * | 5/2002 | Decker | 356/601 |
| 2003/0026463 A1 * | 2/2003 | Yoo | 382/124 |
| 2003/0048928 A1 | 3/2003 | Yavitz | |

\* cited by examiner

METHOD AND APPARATUS FOR A MULTISENSOR IMAGING AND SCENE INTERPRETATION SYSTEM TO AID THE VISUALLY IMPAIRED

FIELD OF THE INVENTION

The present invention relates generally to aiding a visually impaired person. More specifically, the present invention relates to a multisensor system designed to aid a blind, or otherwise visually impaired, person to detect identify and avoid obstacles, and to assist him in finding his way to a specific target or to aid in negotiating spaces where one's view is partially or completely obstructed.

BACKGROUND OF THE INVENTION

Electronic and computerized systems for helping visually impaired and blind people are well known in the art. For example, U.S. Pat. No. 5,687,136 to Borenstein describes an ultrasound based system which gives a proximity warning and is embodied in a cane. The cane is equipped with sensors to calculate the distance to nearby obstacles and guide the user away from potential collisions. The cane is pushed by the user ahead of himself and it maneuvers itself around obstacles by means of two steerable wheels. However, when the user approaches an object, like a closed door through which he wishes to pass, the cane tends to guide the user away from the door. In an effort to solve the problem, the robotic cane's guidance can be overridden or modified via a joystick incorporated into the handle. Where there is direct conflict between the commands of the computer and the human—such as walking up to a door—the cane is set to respond to the human's commands. In situations that are less clear, the computer's and human's commands are combined. For example, where a person directs the cane to turn right but the cane senses an object in the way, the cane would turn slightly to the right, accommodating both the user and sensor inputs. A task which appears beyond the capabilities of the disclosed cane is that it cannot prevent a user from stepping off a curb into traffic.

U.S. Pat. No. 5,936,528 to Kubayashi, teaches a guidance and support apparatus for a visually handicapped person, comprising a resonance tag, antenna and portable scanner. The antenna transmits microwaves from 5 to 60 MHertz. The system provides voice messages, such as "go," "stop" and "turn to left."

Arkenstone is a provider of reading systems for people with visual and reading disabilities, and is used to find out exactly how to get from here to there, and what is encountered along the way. A product called The Talking Map adds software to a user's talking PC, with which the user can explore his neighborhood or city. Once the route is determined in the privacy of the home, the directions are saved to a tape recorder. However, product provides no assistance in physical step-by-step navigation.

In general, the limiting factor on the amount and quality of information that can be generated by systems that sense and communicate via the electromagnetic frequency spectrum, which includes at the low end sound waves and ultrasonic frequencies just beyond audible sound at about 30 KHz, up through microwave frequencies and then lasers in the trillions of Hertz, or cycles per second, is roughly proportional to the frequency itself. Thus, laser-based communications has enormous potential for communicating detailed information.

State-of-the-art laser-based sensing systems include 3D laser imaging sensors and computerized vision sensors. A 3D laser imaging sensor may consist of a laser-based triangulation scanner designed to produce realistic 3D models rapidly. The resulting models are integrated with 3D editing tools. Laser triangulation is one of the most common techniques of 3D data acquisition. It is an active stereoscopic technique where the distance to the object is computed by means of a directional light source and a video camera.

A laser beam is deflected from a mirror onto an object being scanned. The complete object is scanned by incrementally changing first the horizontal angle, $\alpha$, across a line, and then adding lines by incrementally changing the vertical angle, $\beta$. The process is identical to that used to scan an image on to a standard television receiver. For example, there may be 100 by 100 pixels, or scanned points per frame, and five frames are scanned per second. The object scatters the light, which is then collected by a video camera located at a known triangulation distance from the laser. For facilitation purposes the camera is modeled as an ideal lens and the charged coupling device (CCD) detector is modeled as flat. It can be observed that the angle and the pixel position of the scattered light are related. Since the focal length of the camera lens is known, the analysis of the resulting video image can determine the angle of the scattered light.

A pixel is defined as a 2D (2-dimensional) picture element, the smallest resolvable rectangular area of an image, either on a screen or stored in memory. Each pixel in a color image has its own brightness and color, usually represented as a triple of red, green and blue intensities. By contrast a voxel the smallest distinguishable box-shaped part of a three-dimensional space. A particular voxel is identified by the x, y and z coordinates of one of its eight corners, or its center. The term is used in 3D modelling.

The angle is also known, since it is the projection angle of the laser beam, with two angular coordinate components, $\alpha$ and, $\beta$. Thus, using simple trigonometry, the 3D spatial (XYZ) coordinates of a surface point can be determined. Hence the name triangulation.

Simple 3D scanning produces single projection scans from a single viewpoint only. Thus, for 360° model creation, a scan fusion, or "gluing" algorithm is critical.

The first step in gluing is to manually select three corresponding points on the two scans to be glued. This provides a starting translation and rotation vector for the scan fusion algorithm. Since the two scans must have corresponding points, the scans, which are to be glued, must overlap at least ½". Once the points are selected the scan fusion algorithm provides a preview mode allowing the user to see a rough alignment of the fusion. Before starting the fusion process the user may select the scan's geometry or texture to be used as the overriding factor for fusion. Once activated, the fusion algorithm finds the best rotation and translation matrices of the models, "glues" them together creating a single geometry for the object, and finally, re-triangulates. The result is a new seamless geometric model with properly blended textures. This approach permits gluing of almost any object with distinguishing characteristics in either texture or geometry.

Computerized vision sensors with 3D sensing software should include:
   automated digitization with best next view and maybe path planning algorithms, coupled to automated motion when the sensor does have the possibility to move around the digitized object in an autonomous way;
   automated or a least semi-automated transformation and modelization of the raw data, in the form of:
      cloud points,
      triangular meshes,
      parametric surfaces, and high-level geometric primitives such as cylinders, planes or spheres; and visualization and editing of the raw and processed data.

Today this perfect piece of software does not exist, but subsets of it do exist. They are often specialized in a particular application and prove efficient enough in that context. Movies are among the first to use 3D geometry capture and modeling techniques.

The general principle of 3D sensing is that sensors receive light, or other forms of energy such as ultrasound or x-rays, from their environment and are supposed to construct a model of this environment. The model depends on the application:

In 3D sensing, the goal is usually a precise 3D geometrical model of the surface of objects. It is attempted to detect the reflection of light, etc. on the surface of objects;

Sometimes the 'color' properties of a surface must also be digitized; and

For inspection purposes, it is sought to map the physical properties inside an object, and to interpret changes in the incoming signal due to the changing physical properties inside an object.

A few years ago, mobile robotics were the main field of application for 3D sensing. Computer vision scientists were mainly interested in passive sensing techniques that were supposed to reflect the way the human eye is working. Passive, means that no energy is emitted for the purpose of sensing, it is only received. Such passive techniques include stereo vision and monocular shape-from-X techniques like shape-from-contour or shape-from-shading. The problem is that recovering 3D information from a single 2D image is an ill-posed problem. Thus, monocular techniques have to add a priori information such as surface smoothness to recover 3D data, a process known as regularization. Regularization is most often context dependent and is difficult to apply outside of the lab.

The majority of automated video identification is done with 2 dimensional modeling. Identification may be greatly enhanced by 3 dimensional recognition of contour through depth perception.

To overcome the above problems of passive sensing, active sensing techniques have been developed. Active means that properly formatted light, etc. is emitted, and then received, once it has been interacted with the object to digitize. Typically, light is emitted in the direction of an object, reflected on its surface and recovered by the sensor, and then distance to the surface is calculated using triangulation or time-of-flight.

Volume digitization techniques like computerized tomography (CT), magnetic resonance imaging (MRI) or ultrasound imaging also fall in this category.

Effective television mini-cameras also are generally expensive, costing $50,000. To be useful for helping the visually impaired and blind person, it is important to be able manufacture an effective camera for approximately $400.

Thus, the trend is to integration or fusion of 3D techniques, and there is therefore a need in the art for a system to provide increased efficiency, adaptability and versatility for the fusion of 3D and computer vision sensing for the benefit of visually impaired and blind people.

SUMMARY OF THE INVENTION

It is an object of the present invention to provide methods and apparatus for increased efficiency, adaptability, economy and versatility in a multi-sensor system for the benefit of visually impaired and blind people in finding their way to a specific target.

It is a further object of the present invention to provide methods and apparatus for an improved 3 dimensional algorithm for sensing and identifying objects in the field of vision sensor confronting visually impaired and blind people.

It is a still further object of the present invention to provide methods and apparatus to enable the creation of an overall mental picture of the surrounding physical environment of a visually impaired or blind person, and to enhance communication concerning the environment.

An apparatus and method are described for aiding a visually impaired or blind person to detect, identify and avoid objects in the field of vision of the surroundings. The apparatus includes electro-optical devices to detect and identify objects, a control unit, which receives and processes information from the devices and a vocal representation unit to receive instructions from the control unit for the purpose of audibly describing the objects to the person in the field of vision, thereby enabling the person to cope and proceed safely in the surroundings. The method describes the aid for a visually impaired person to detect, identify and avoid objects in the field of vision surroundings, including the steps of receiving visual images of the objects, receiving range information concerning the objects, processing the image information and audibly describing to the person the objects in the field of vision, thereby enabling the person to cope with, and proceed in his surroundings.

These objects, and others not specified hereinabove, are achieved by an exemplary embodiment of the present invention, wherein the system of the present invention is designed to aid visually impaired or blind people to detect, identify and avoid obstacles on their way and assist in finding their way to a specific target. The integration of two sensors, a 3D laser imaging sensor and a computerized vision sensor, create an overall mental image of the surrounding physical environment. The system of the present invention is compact and light weight, and can be mounted on head of the blind person.

The system of the present invention provides detection and identification of fixed or moving obstacles, and can provide estimates of the relative range, speed and bearings of several simultaneous obstacles and objects. The system of the present invention alerts the blind person of immediate danger and provides the needed information by synthesized voice.

The system of the present invention has small physical dimensions, allowing the user free movement. Object identification and description is provided for a range up to 20 meters, as well as alerts for potential close range obstacles between one and two meters away, including stationary and moving objects, and changes in ground level, for example, steps or a ramp. The system gives estimates of the relative speed of objects, such as "moving fast towards you," or "moving away", etc. A continuous verbal scene description is provided according to the relevance and level of threat. The system of the present invention has the ability to "concentrate" on a specific object in order to achieve a higher level of details, and has the ability to read signs. A capability to "learn" is built in, thereby continually adding to the stored environment model with new objects, relevant details and description methods.

The present invention will be more fully understood from the following detailed description of the preferred embodiments.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 1:
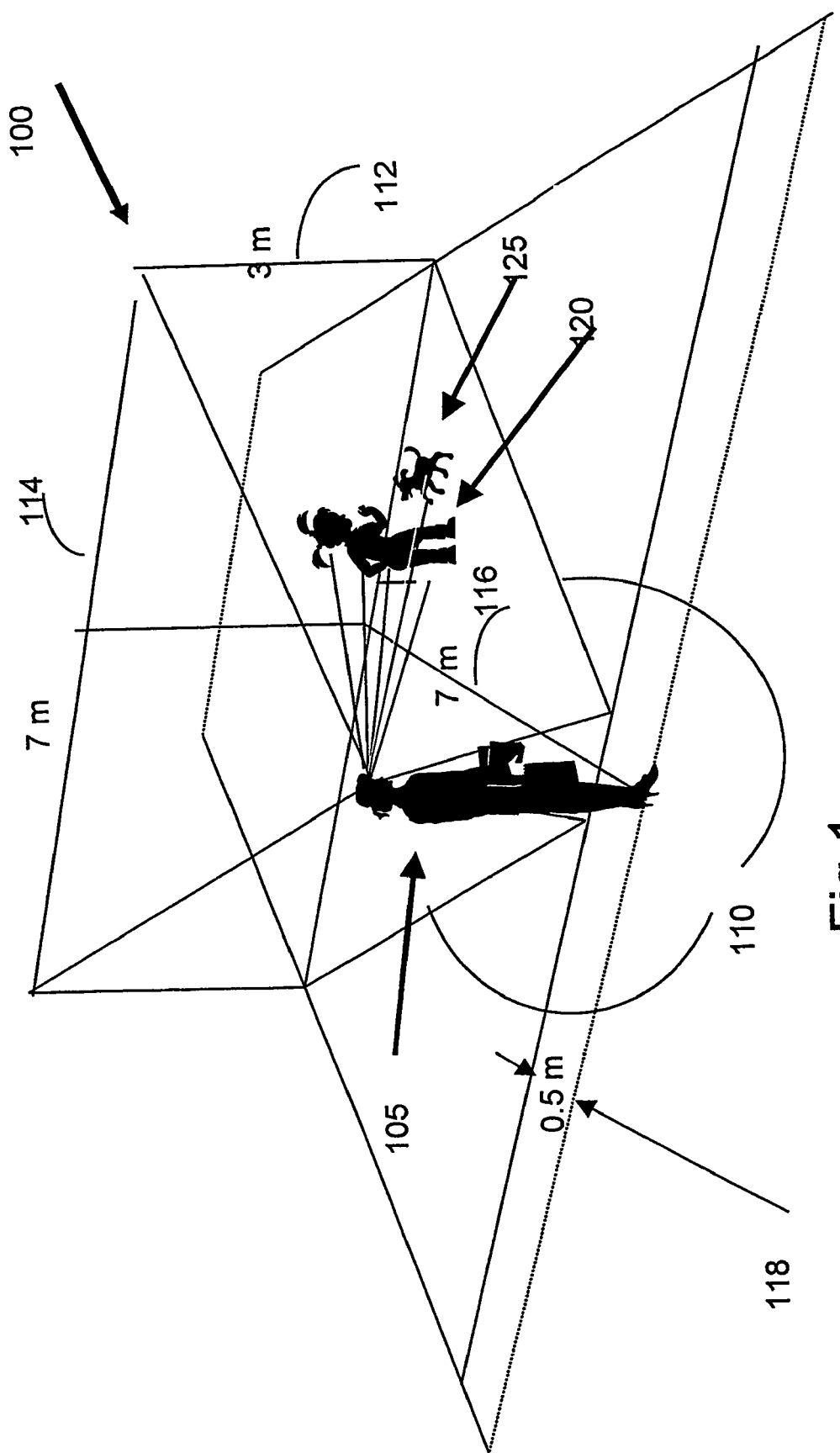
FIGS. 1-1a are, respectively, a schematic spatial relation illustration of a user facing the field of vision, and a coordinate system, in accordance with an exemplary embodiment of the present invention.
Figure 1A:
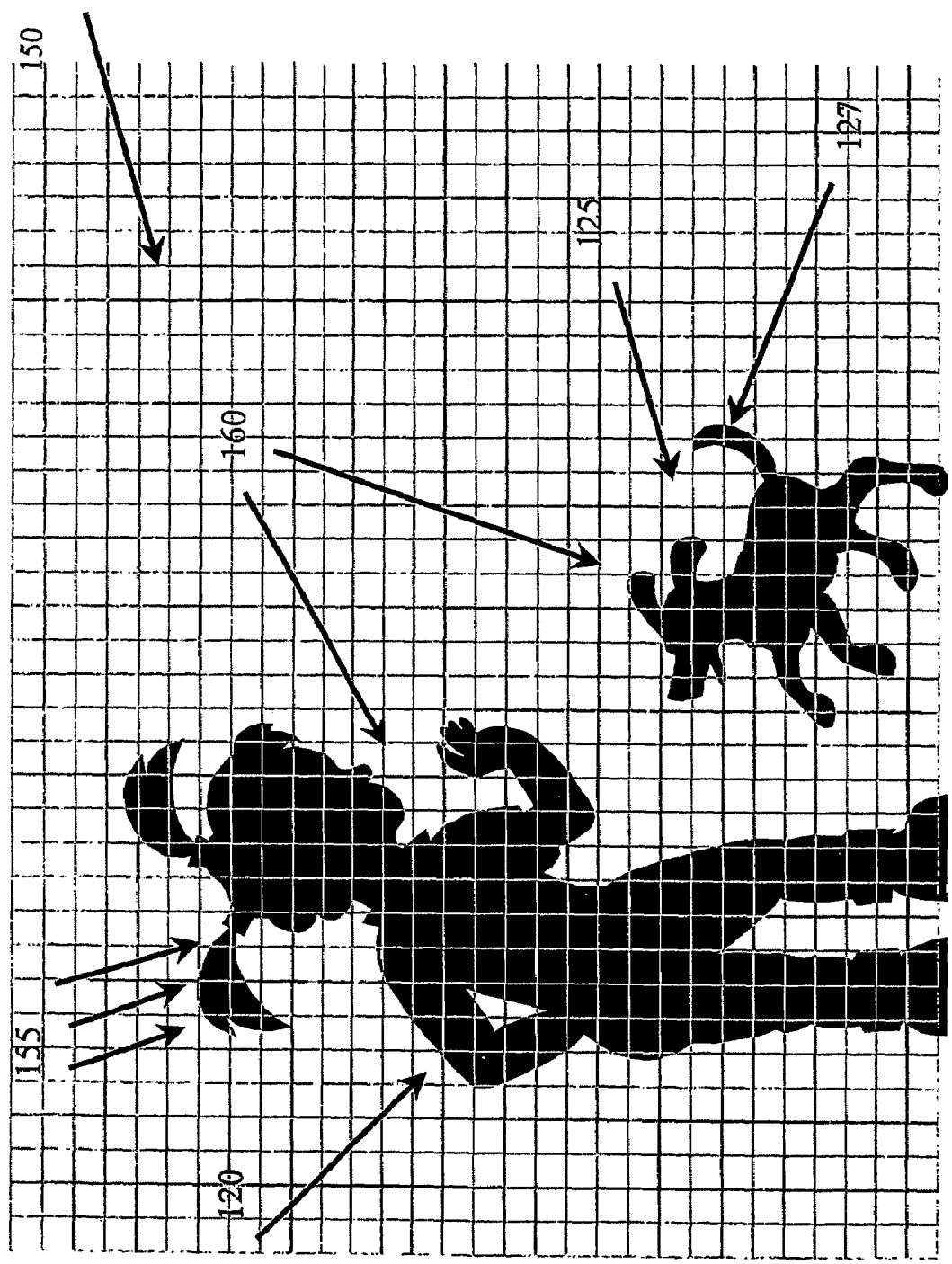

Reference is now made to FIGS. 1-1a, which are respectively, a schematic spatial relation illustration 100 of a user/blind person 105 facing the field of vision 110, and a coordinate system, in accordance with an exemplary embodiment of the present invention. The height 112 of field of vision 110 is seen to be 3 meters and the width 114 at the far end is 7 meters at a depth 116 that is also 7 meters, but is no closer than a minimum depth 116. Two exemplary "objects" 160 are shown, a girl 120 and a dog 125.

The system analyzes the surroundings according to the locality of anything present in the area within the boundaries, such as girl 120, dog 125, dog's tail 127 or the ground, walls, fence, building or treeline present in the area of field of vision 110, static or moving. The system locates exceptions in the surfaces within the boundaries: a decline or elevation in the ground, a protrusion or recess, an opening in a wall, etc. The system identifies and recognizes movement, and has concern for any living beings, such as girl 120 and dog 125, in field of vision 110. The system gains knowledge by analyzing movements derived from objects positioned near user 105.

Field of vision 110 of the system is defined by coordinate guidelines 150, which originate from the axes of coordinate 300, described hereinbelow in FIG. 3, which are located in front of user 105, and the x-axis 305 in the direction at the start of operation. The system describes the objects in the surrounding area by giving them names.

Figure 2:
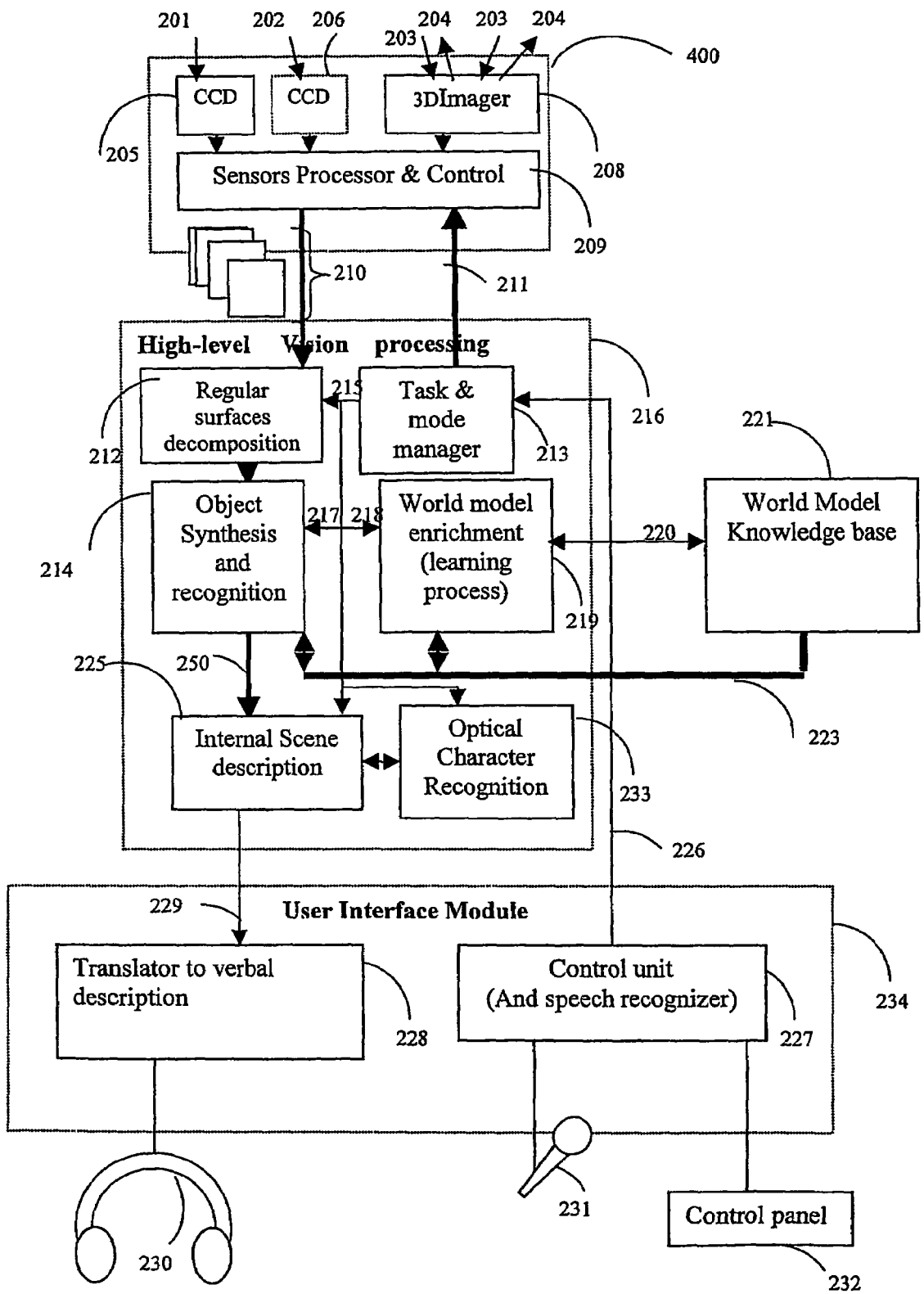
FIG. 2 is a schematic system functional block diagram illustrating the aid to a blind person system, in accordance with an exemplary embodiment of the present invention.

FIG. 2 is a schematic system functional block diagram illustrating the aid to a blind person system, in accordance with an exemplary embodiment of the present invention.

Descriptions follow the system functional block diagram presented in FIG. 2, and will refer to the other figures in order to enhance the explanation.

Figure 4:
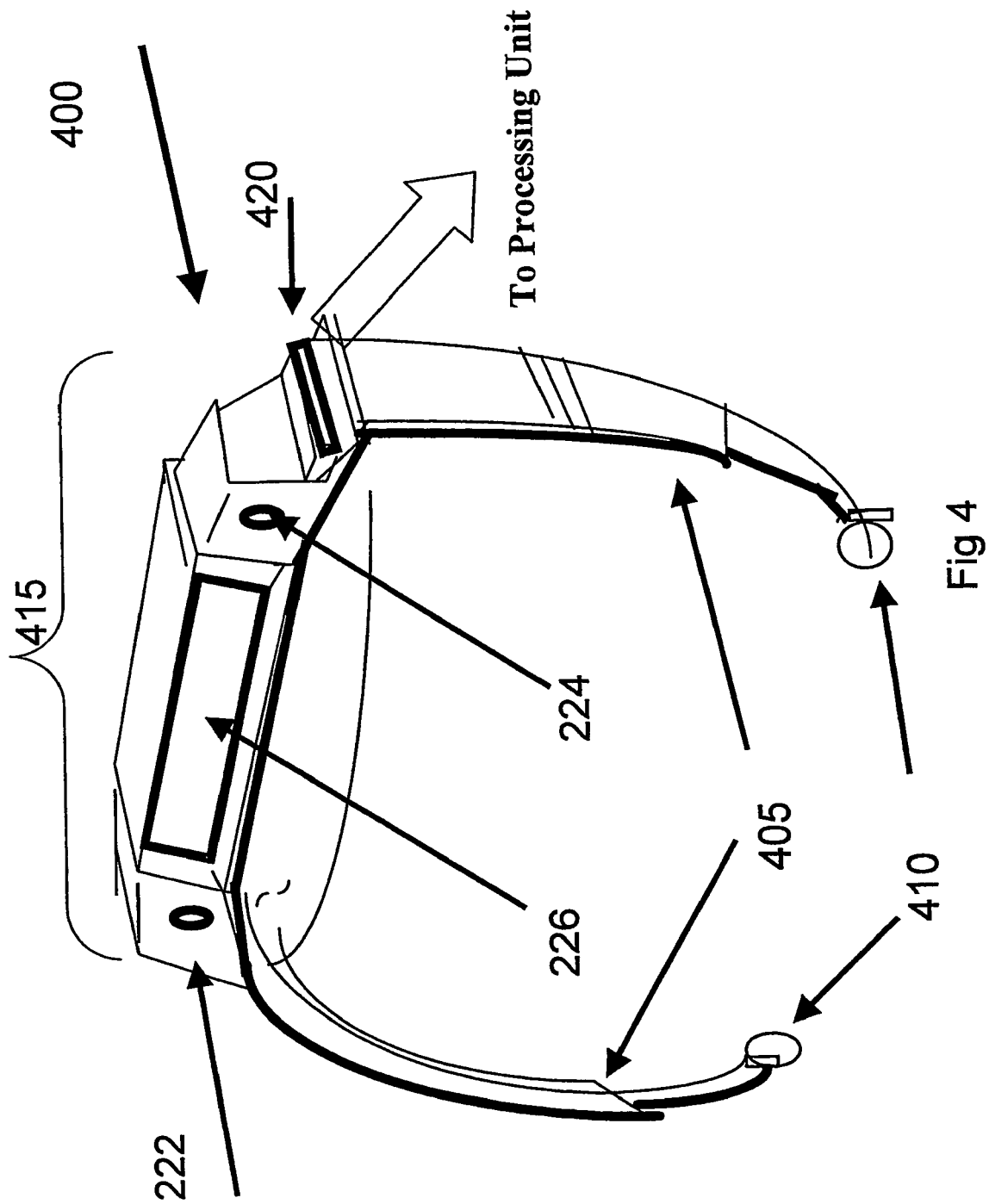
FIG. 4 is a schematic illustration of the headset, in accordance with an exemplary embodiment of the present invention.

The input unit 400, illustrated in FIG. 4 comprises two sensors, CCD sensor 205 and 3D imager 208, and an optional third sensor shown as CCD sensor 206. 3D imager 208 emits sequences of laser beams 204 and measures the time of arrival of the return beams 203 in order to compute the distance to the point on the surface of any object in the field of vision. CCD sensor 205 is a camera that senses the color (as combination of Red, Green, and Blue) of the points on the surfaces of objects. In the optional arrangement, imager 208 is used in order to project a structured light grid on the objects in the field of vision, while both CCD sensors 205 and 206 are used to compute the distance to the object's points in addition to their roles as color sensing cameras.

The sensors processor and control unit (SP&C) 209 performs the necessary integration between the sensed data streams from the sensors, and the computation needed in order to relate distance and color information to each grid point in the field of vision. Control unit 209 also functions to adapt the sensors to any required depth of the field of vision.

Figure 5:
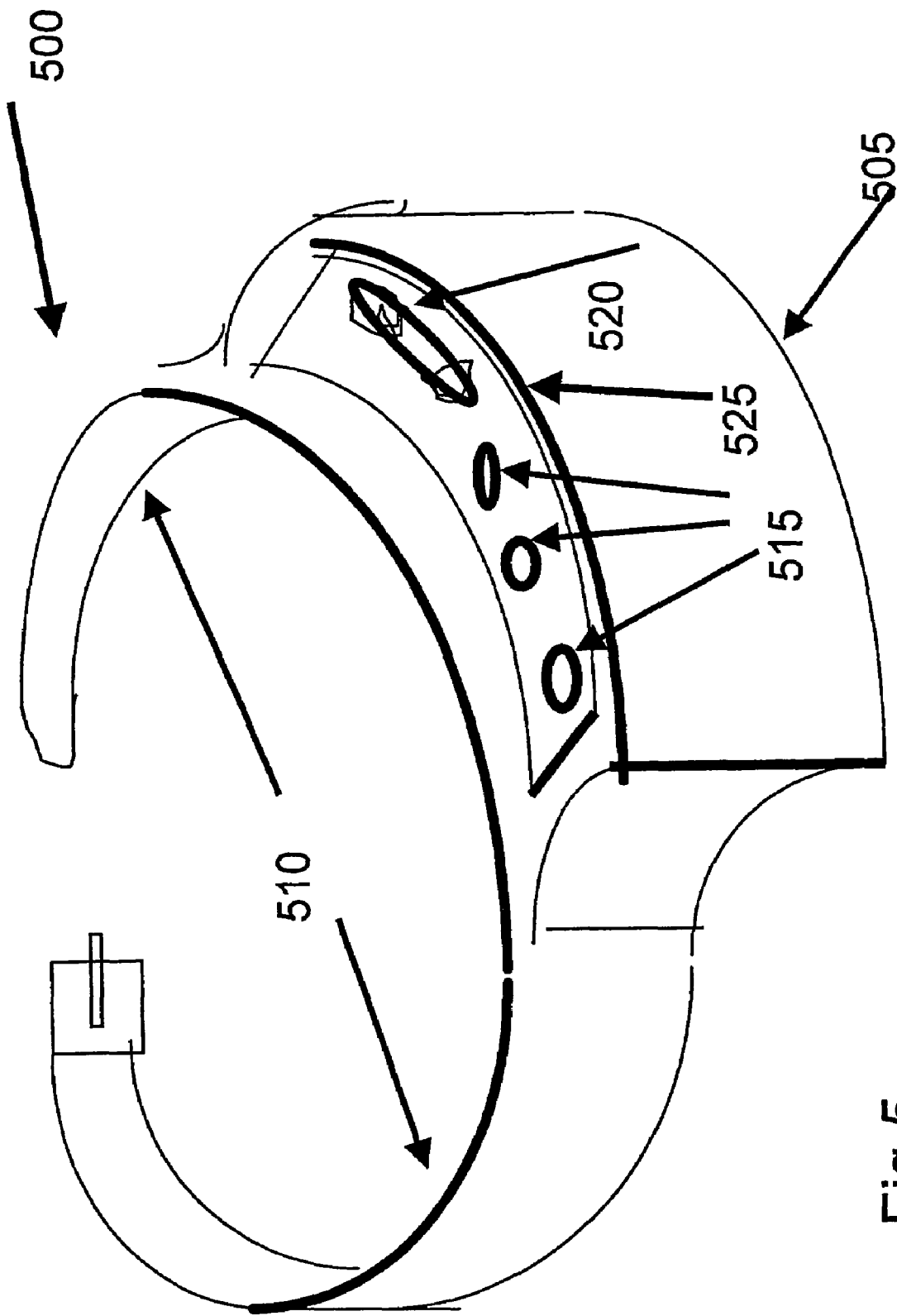
FIG. 5 is a schematic illustration of the beltset, in accordance with an exemplary embodiment of the present invention.

The input unit of FIG. 4 is wired or wirelessly linked via port 420 to the belt unit 500 illustrated in FIG. 5. This link enables bi-directional flow of information. The arrow 210 represents the flow of frames of 100×100 grid points, each point with its associated range and color information. Arrow 211 represents the control information flowing into sensors control 209, requesting a required field of vision 110 setup.

The belt unit, as illustrated in FIG. 5, contains three functional modules: the High level vision processing module 216; the World Model knowledge base 221; and the User Interface module 234.

The World Model (WM) 221 includes the description of known objects, their relations to their components, and the relations among the components. In addition, WM 221 includes the grouping of known objects into classes, the common properties of classes, and the common relations between classes of objects. For example, a specific chair will be described as composed of four column shaped components (legs), arranged as a rectangle with a flat horizontal board on top (seat). It belongs to a class of objects named Chair. This class has common physical dimensions, typical ranges of height width and typical behavior in time—it is stationary. The class Chair has a typical relationship with the ground: on top, and a common relationship with the class of objects Table: near.

The atom elements (the lowest level elements with no subcomponents) in WM 221 are the set of regular spatial surfaces. i.e. the planes and smooth surfaces of the second order.

Stream of frames 210 is analyzed in order to decompose each frame into regular blocks 212. The sequence of frames contains range and color information of sensed spatial points. Each block is characterized by its physical dimension, general shape description, color, and/or texture property. Movements of blocks are tracked along a continuous sequence of frames. A moving average is calculated for each sequential group of several frames, thereby smoothing any effect of random head movements. The smoothed movement vector is added to the other regular surface properties, and the complete list of properties is passed on to the Object Synthesis and Recognition module 214.

In Object Synthesis and Recognition module 214, relations between surfaces are computed, and a bottom up search into WM 221 is initiated as represented by arrow 223, in order to find an object class description that matches any subset of the surfaces and the relations among them. In turn, subsets that were identified as belonging to an object class are going through the same process in order to find a match with a more complex (higher in the hierarchy) object class. The subset of surfaces is then regarded as recognized, it is named as belonging to the object class and its output to the next sub-module is represented by arrow 250. The process continues until all the surfaces are interpreted as belonging to the highest-level object class possible.

The recognition process makes use of all available information that can be extracted from the sensed data. Internal structure or shape is the way the object is composed of lower level (less complex) components, e.g. the way a bench is composed of the legs seat and backrest, and the relations among them. The object's measurable properties are its physical dimensions, dominant color and dominant texture.

For example, the typical size of a bench is 1 meter wide and 130-150 cm high. The object's typical relations with other object classes in the surrounding neighborhood include physical relations like beside, on top, above etc. The recognition process follows the principle that recognition is achieved if the information available is enough to define it as belonging to a unique object class in WM 221. If the recognition using this principle is not satisfactory a correction is made (see below) the WM 221 is enriched and a learning process takes place. Hence, in a moderately rich WM 221 the following simple examples are feasible:

A regular recess in the ground—is a curb of the sidewalk.
An object moving at knee height—is a dog.
A green object on the ground about 140 cm high and 150 wide—is a bench.
A hole in a vertical surface 190 cm high and 80 cm wide—is an entrance.

The list of object classes identified, together with their position information, physical dimensions, and relative velocity vectors, constitute an internal scene description 225. Scene 225 description is then ordered according to distance from the user and filtered according to the mode of operation 215 as described hereinbelow. The filtered scene description is passed, as represented by arrow 229, to a text to speech translator 228, located in interface unit 234 where a verbal description is generated and transmitted through the headphones 230, which are physically a component of the head mounted unit FIG. 4.

In the case where an object is identified as belonging to the object class of Signs, control is passed to the OCR 233, which attempts to interpret words in the sign, and return the words interpreted as part of internal scene description 225.

The World Model enrichment module (WME) 219 is responsible for the continuous adaptation of WM 221 to new experience (The "learning" process). Adaptation is carried out in several modes:

Direct teaching: A part of a scene is given a name by the user. This means that a number of recognized objects fulfilling a group of relations among themselves, themselves constitute an object belonging to an object class by the given name. It might be a new object class to WM 221, in which case the given part of the scene is the first sensed instance of a particular variation of the object class. And, it might be a new development for an existing class, which means that the object class definition has to be modified in order to include a variation of the newly defined object. For example, a part of a total scene is composed of two vertical boards and a group of several horizontal boards between them is named by the user a cabinet. If it is the first time this name is used a new object class is generated by this name. If an object class a cabinet already exists, grouping some other variations of cabinets, such as having a closed door, the object class definition will be broadened in order to include the new type of cabinet in the definition.

Generalization (by positive enforcement or by default): A part of the scene is identified as belonging to a specific object class, although some of the relationships, or some of the components, deviate from the definition in WM 221. Cases occur where this specific object class is still the best match for the given segment of the scene. Either acceptance by default, or by positive confirmation of the user, causes the process to generalize the set of definitions of the object class in order to include the newly sensed segment of the scene as an included variation. For example, a segment of the scene, which consists of four column shaped objects and a flat board on top, is identified as belonging to the object class a chair, although the definition of this object class includes the existence of a backrest. No response or confirmation by the user causes the process to generalize the set of definitions of a chair to include such stool type chairs.

Refinement (by negative enforcement or correction): If a part of the scene is identified as belonging to an object class, and the user rejects the identification, the process refines the set of definitions to permanently exclude such identification in the future. However, if the user makes a specific correction by later accepting identification of this segment of the scene, it will be treated as an example of the direct teaching case above.

Hence, starting from a given set of object classes, which represent regular surfaces, WM 221 is enriched by presenting objects to the sensor, naming them, confirming right identifications, and correcting wrong identifications throughout the routine usage of the system.

The task & mode manager (T&MM) 213 is the control module that coordinates the various components according to the mode of operation dictated by the user. The following are the various modes of operations made possible by the module:

Complete scene description. The T&MM 213 sets the regular surfaces decomposition (RSD) module 212 to pass on the complete set of surfaces in field of vision 110, each time adding new surfaces entering field of vision 110 as a result of conscious head movements. And, T&MM 213 sets internal scene description module (ISD) 225 to pass the full scene description, represented by arrow 229, to the translator 228.

On going description. T&MM 213 sets ISD 225 to pass on to translator 228 only incremental changes in field of vision 110.

Obstacle avoidance. T&MM 213 sets RSD 212 to relate only to surfaces of up to 3 meters in range or moving towards the user, for example.

Focus mode. T&MM 213 sets SP&C 209 to narrow the spatial angle of field of vision 110 around the central axis, and updates RSD 212 and OSR 214 on the change of setting. Hence the sensors acquire more detailed information on the object in the center of field of vision 110. The various "teaching modes" described above take place while the system is in the focus mode, "concentrating" on a single object.

Search mode. T&MM 213 sets OSR 214 to search for a specific object or object class in field of vision 110. This means that a top down search is being carried out, and surfaces not relevant to these are being disregarded. T&MM 213 sets ISD 225 to pass on only one object or none at all (search failed).

T&MM 213 interfaces to the user via the path represented by arrow 226 by means of the control unit 227, which integrates the inputs from both a control panel 232 and the microphone 231. The user instructions as to the mode he wishes the system to operate in, are given either by punching keys on the control panel, or by voicing a verbal command. In the same manner, naming a new object or object class, approving, and rejecting are done either by the control panel or by voice. Control unit 227 operates the decoding algorithms and the voice recognition engine. Control unit 227 decodes the instructions or the responses, and passes them on to T&MM 213, which in turn sets up the various modules, or passes the proper response to WME 219.

Figure 3:
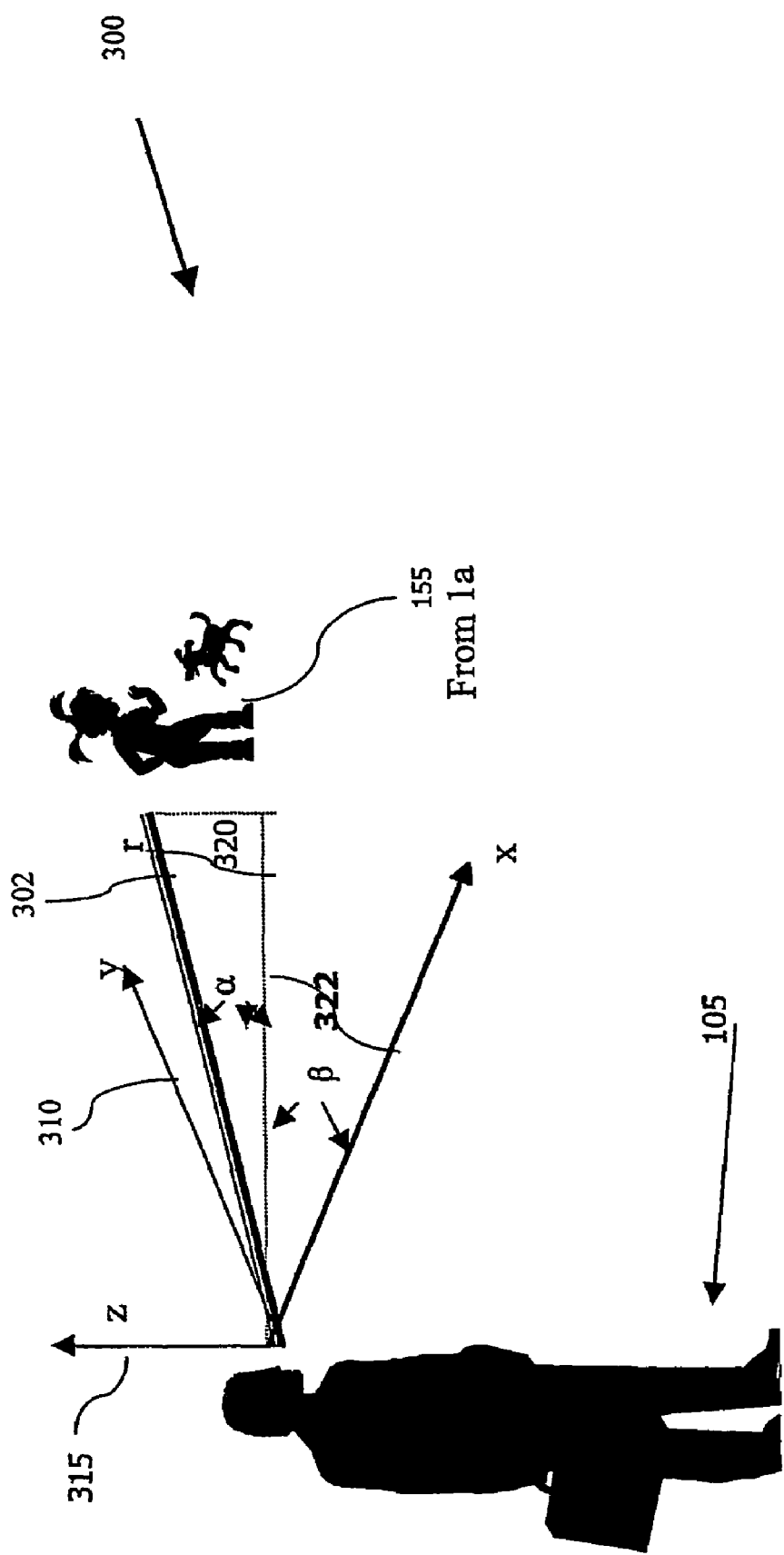
FIG. 3 is a schematic illustration of the coordinate system for a user facing the field of vision, in accordance with an exemplary embodiment of the present invention.

FIG. 3 is a schematic illustration of the coordinate system 300 for a user facing the field of vision, in accordance with an exemplary embodiment of the present invention. The x-axis 305 and the y-axis 310 form a horizontal plane. The z-axis 315 is vertical. By integrating along the time axis, which is a non-visible "fourth dimension," relative velocity vectors are calculated, which are associated with the polygons. The system provides position measurements for the distance to object 155, i.e., r the range 302 and the exact vertical angle 320, α, and the exact horizontal angle 322, β, wherein each angle is measured to within 0.3°. Each pixel is expressed as [R, G, B, r](α, β, t), where R, G, B represent primary color components red, green and blue, r is the range the distance, and t is the time. Thus each of the four values for each pixel—R, B, G and r—are a function of α, β and t. Vertical angle 320, α, varies from +10☐ above the horizontal to −80° nearly straight down, and horizontal angle 322, β varies from −45° to +45°.

FIG. 4 is a schematic illustration of the headset 400 for use with the present invention, in accordance with an exemplary embodiment of the present invention. Having temples 405 in the manner of glasses, and worn similarly to glasses, headset 400 is preferably constructed so that it does not inhibit the head movements of user 105. Video sensor 205, i.e., a CCD chip or miniature television camera, and scanning rangefinder 215 are mounted in the headset carrying compartment 415. A pair of earphones 410 and a microphone are subcomponents of headset 400. A small processing unit, not specifically shown, carried in the beltset 500 of user 105, is connected by a link (wired or wireless) to port 420, which may be a physical input port or a wireless port for example of the kind used for short range infrared transmissions (such as required by for Bluetooth specification), and therefrom is connected to sensors 222, 224 and 226 and earphones 410. In a preferred embodiment link 420 is wireless, using infrared (IR) communication, for example, which is quite over the fraction of a meter distance concerned. Preferably, headset 400 does not have external parts detracting from the appearance of user 105, or parts sensitive to environmental conditions.

So as not to block audibility of ambient sounds, so important to a blind person, earphones 410 are designed so as not to fit directly into or over the ears, and/or only a single earphone 410 is provided.

Functions embodied by headset 400 are not necessarily embodied specifically by a device worn directly on the head in the manner of eyeglasses.

FIG. 5 is a schematic illustration of a beltset 500, in accordance with an exemplary embodiment of the present invention. Beltset 500 carrying a compartment 505 includes the Processing and Computation Unit and the power supply. Beltset 500 is coordinated to be worn conveniently by means of the pants belt 510. Beltset 500 contains a number of operating switches and dials 515, which are optionally designed to detach and hold conveniently in the hand. The operating switches 520 and 525 on the front of beltset 500 are used to dictate the mode of operation of the device.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description, and which are not specifically disclosed in the prior art.

What is claimed is:

1. A system for aiding a person with a visual impairment or visual obstruction, comprising:

means for sensing time/space characteristics and physical characteristics information about a plurality of objects in a field of view of said person, said sensing means operating by reflecting and capturing laser pulses from the surfaces of said plurality of objects present in close range to said person to produce a cloud of spatial pixels (voxels) representing points on all said surfaces which can be observed from said person's point of view;

means for identifying, interpreting, decomposing, and synthesizing said time/space characteristics and physical characteristics information and for high-level characterizing said plurality of objects in an object class, said means for identifying operating by:
applying a set of low-level algorithms to decompose said cloud into a set of regular surfaces defined by parameters of type, dimensions, orientation in space, and relative to said user velocity vector, and
applying a set of high-level algorithms to act on said surfaces to combine them into identified 3-D objects with assigned names;

and means for verbally communicating output and input information between said system and said user, wherein said output information further comprises a scene description about said surrounding environment within the field of view of said person, wherein said scene description is verbally communicated in conversational speech to said person based on the distance of said plurality of objects to said user, the closest being communicated first as having a higher priority, wherein said scene description comprises said plurality of objects identified by said system, together with properties such as their position information, physical characteristics, and relative velocity vectors indicating motion, and wherein said properties are provided by an Object Synthesis and Recognition module which associates said properties with an identified object class.

2. The system of claim 1, wherein said means for sensing comprises image sensing devices selected from the group consisting of: CCD sensors, and a 3-D laser imaging sensor.

3. The system of claim 1, wherein said time/space characteristics and physical characteristics information about an object includes any of: physical dimensions, general shape description, texture, color, the distance and position of said user from said object, motion of said object, spatial relationships between objects.

4. The system of claim 1, wherein said means for interpreting said time/space and physical characteristics information comprises: a Sensors Processor and Control Unit (SPC) for interpreting low-level sensing data from said sensing means, and a High-level Vision Processing module for interpreting high-level sensing data from said sensing means.

5. The system of claim 1, further comprising a World Model knowledge database for performing said high-level characterizing.

6. The system of claim 5, wherein said World Model database comprises data selected from the group of:
physical descriptions of known objects and components thereof;
the relations of said objects to their respective said components;
common relationships among said components;
groupings of said known objects into classes and subclasses;

common properties of said classes, subclasses and groupings; and common relations among and between said classes, subclasses and groupings.

7. The system of claim 5, wherein said World Model database is continuously enriched by adaptation to new experiences of said person and implemented in at least one option selected from the modes:

direct teaching mode;

generalization teaching mode by positive enforcement or default; and refinement teaching mode by negative enforcement or correction.

8. The system of claim 7 wherein said direct teaching mode comprises giving a name to a part of a scene by said user.

9. The system of claim 7 wherein said generalization teaching mode comprises identifying a part of a given scene as belonging to a specific object class, although some of the relationships, or some of the components, may deviate from that identified in said database.

10. The system of claim 7 wherein said refinement teaching mode comprises refining the set of definitions to permanently exclude in the future an identification of only part of a scene as belonging to a specific object class when said user has rejected said partial identification.

11. The system of claim 7 wherein verbal instructions are received from said person in a direct teaching mode to improve said World Model knowledge database capabilities for naming and classifying a plurality of objects within said field of view.

12. The system of claim 1, wherein said means for interpretation comprises scene interpretation data and sensed data streams.

13. The system of claim 1, wherein said means for interpretation further comprises computations for relating distances and color information of said plurality of objects and components thereof within the field of vision of said person.

14. The system of claim 1, wherein said output information comprises said characterization and interpretation of said plurality of objects.

15. The system of claim 1, further comprising an automatic speech recognition unit for verbal input of instructions from said person for controlling said system.

16. The system of claim 15, wherein said instructions comprise naming and classifying objects known to said user.

17. A method for detecting, analyzing, identifying, and reporting a plurality of objects by name to a visually impaired or blind person in a field of view of said person, comprising the steps of:

providing a 3-D laser imaging system to accurately measure both the coordinates of said plurality of objects in both static and dynamic motion and the characterization of the relationships between said plurality of objects in relation to said person;

acquiring a plurality of 3-D visual images and information about said plurality of objects;

processing said plurality of 3-D visual images and said information;

storing said information of said plurality of objects by names in a hierarchy utilizing a structured World Model;

identifying said plurality of objects, and communicating verbally with said person to report said information about said plurality of objects in said field of view, reflecting and capturing laser pulses from the surfaces of said plurality of objects present in close range to said person to produce a cloud of spatial pixels (voxels) representing points on all said surfaces which can be observed from said person's point of view;

applying a set of low-level algorithms to decompose said cloud into a set of regular surfaces defined by parameters of type, dimensions, orientation in space, and relative to said user velocity vector; and applying a set of high-level algorithms to act on said surfaces to combine them into identified 3-D objects with assigned names.

18. The method of claim 17 further comprising 3-D object rendering.

19. The method of claim 17 further comprising:

providing a process of learning new facts about said physical surroundings of said person for growth and expansion of said World Model.

20. The method of claim 17 wherein said World Model hierarchically represents existing knowledge of the physical surroundings of said person; classes of said plurality of objects; the common relationships of said plurality of objects to their components; and the way low-level components in said hierarchy can be composed of regular surfaces.

* * * * *